(12) United States Patent
Nünnerich et al.

(10) Patent No.: US 10,426,187 B2
(45) Date of Patent: Oct. 1, 2019

(54) CONTAINER SEALING DEVICE FOR HIGH-PRESSURE CHAMBER

(71) Applicant: UHDE HIGH PRESSURE TECHNOLOGIES GMBH, Hagen (DE)

(72) Inventors: Peter Nünnerich, Siegen (DE); Wilfried Knauf, Herdecke (DE)

(73) Assignee: UHDE HIGH PRESSURE TECHNOLOGIES GMBH, Hagen (DE)

(*) Notice: Subject to any disclaimer, the term of this patent is extended or adjusted under 35 U.S.C. 154(b) by 0 days.

(21) Appl. No.: 14/647,750

(22) PCT Filed: Nov. 26, 2013

(86) PCT No.: PCT/EP2013/003557
§ 371 (c)(1),
(2) Date: May 27, 2015

(87) PCT Pub. No.: WO2014/082728
PCT Pub. Date: Jun. 5, 2014

(65) Prior Publication Data
US 2015/0296864 A1    Oct. 22, 2015

(30) Foreign Application Priority Data

Nov. 28, 2012  (DE) .................. 10 2012 023 186

(51) Int. Cl.
*A23L 3/015*  (2006.01)
*A23P 10/00*  (2016.01)
*A23L 3/00*  (2006.01)

(52) U.S. Cl.
CPC .............. *A23P 10/00* (2016.08); *A23L 3/001* (2013.01); *A23L 3/0155* (2013.01)

(58) Field of Classification Search
CPC ........ A23L 3/001; A23L 3/015; A23L 3/0155; A23P 1/00; A23P 10/00; B30B 11/002;
(Continued)

(56) References Cited

U.S. PATENT DOCUMENTS 5,703,334 A * 12/1997 Hansson ............... G01G 3/1408
                                                        177/184
5,704,462 A *  1/1998 Grosspietsch .......... B60T 11/16
                                                        192/85.59
(Continued)

FOREIGN PATENT DOCUMENTS

DE    102005014835 A1   10/2006
DE    102009042088 A1   12/2010
(Continued)

OTHER PUBLICATIONS

German Language International Search Report for International patent application No. PCT/EP2013/003557; dated Jul. 15, 2014.
(Continued)

*Primary Examiner* — Dana Ross
*Assistant Examiner* — Joseph M Baillargeon
(74) *Attorney, Agent, or Firm* — thyssenkrupp North America, Inc.

(57) ABSTRACT

A device for high-pressure treatment of goods in a sealable high-pressure chamber may include a holding frame that holds the high-pressure chamber during pressurization, a closure having a sealing plug for sealing the high-pressure chamber, a hydraulic drive for moving the closure relative to the pressure chamber, and a support device that is movable between an end face of the high-pressure chamber and the holding frame and transmits force between the closure and the holding frame during pressurization. Axial forces acting on the sealing plug from the pressure may be absorbed by a force-transmission device configured as a semicircular disk.

(Continued)

Figure 1:
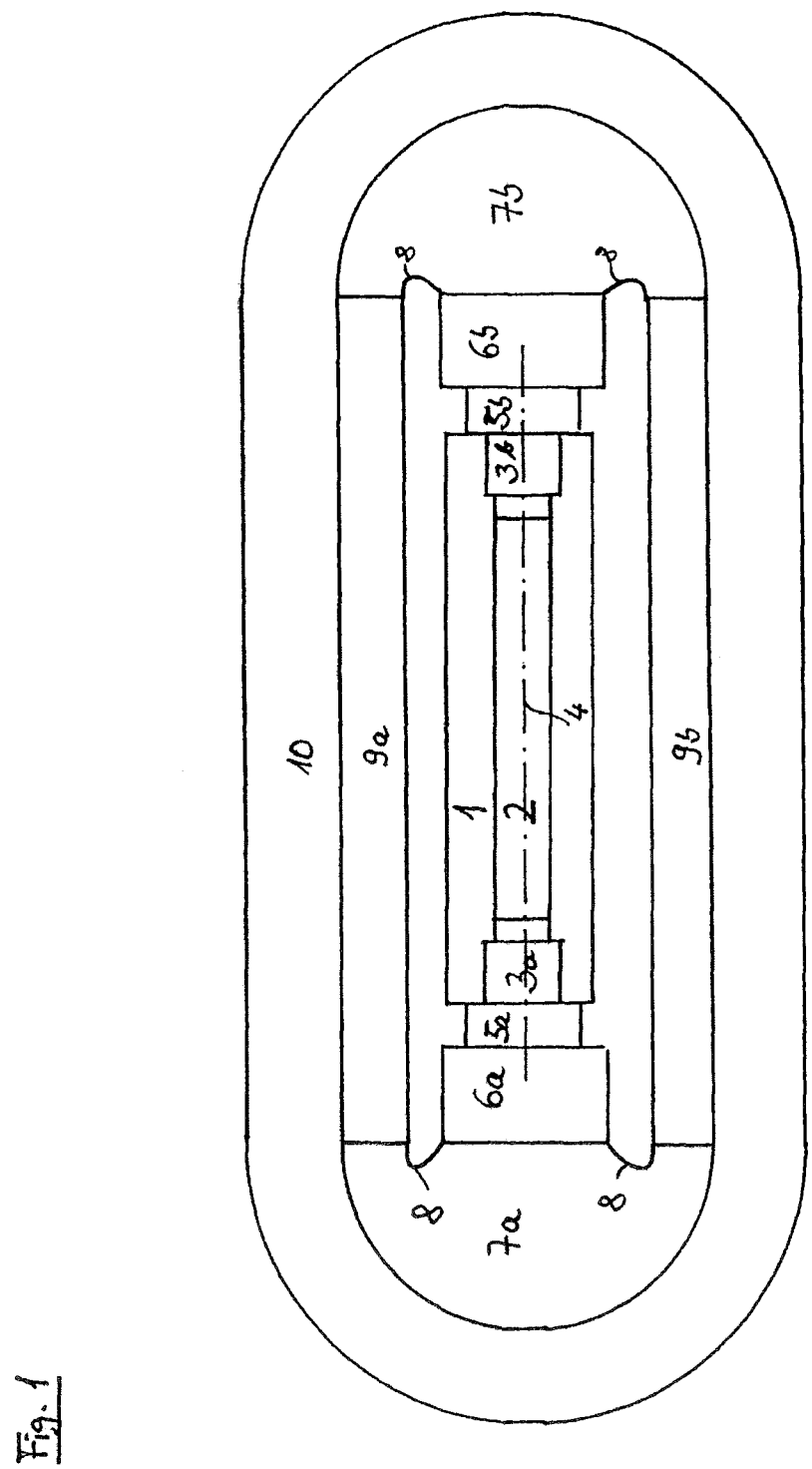

The semicircular disk may have an end face that faces the high-pressure chamber and a holder for a hydraulic cylinder. The semicircular disk may form a part of the outer shell of the hydraulic cylinder bearing the hydraulic pressure.

13 Claims, 2 Drawing Sheets

(58) Field of Classification Search
CPC ........ B30B 11/001; B30B 11/004; B22F 3/03; B22F 2003/031; A22C 9/00; A22C 9/002
USPC ......... 99/467, 472, 473, 559, 367–369, 371; 100/215; 422/292, 295, 296; 452/141
See application file for complete search history.

(56) References Cited

U.S. PATENT DOCUMENTS

| | | | |
|---|---|---|---|
| 6,491,882 B1* | 12/2002 | Van Den Berg | ......... B01J 3/048 220/589 |
| 8,771,773 B2 | 7/2014 | Richter | |
| 2004/0250714 A1* | 12/2004 | Svensson | ................... B01J 3/04 100/269.01 |
| 2011/0070341 A1* | 3/2011 | Richter | ................. A23L 3/0155 426/231 |
| 2012/0304872 A1* | 12/2012 | Brangel | ................ A23L 3/0155 100/35 |

FOREIGN PATENT DOCUMENTS

| | | |
|---|---|---|
| WO | 2010/102644 A1 | 9/2010 |
| WO | 2011/091860 A1 | 8/2011 |

OTHER PUBLICATIONS

English translation of International Search Report for International patent application No. PCT/EP2013/003557; dated Jul. 15, 2014.
English translation of abstract of DE 102005014835 (A1).

* cited by examiner

CONTAINER SEALING DEVICE FOR HIGH-PRESSURE CHAMBER

The present invention relates to a device for a vessel closure of a high-pressure chamber for the high-pressure treatment of, for example, packaged products, wherein, in the high-pressure chamber, the products are subjected to the action of a high-pressure medium and are treated with a pressure of up to 10,000 bar or 1 GPa.

For the high-pressure treatment, use is made of a machine complex composed of
- a closable high-pressure chamber,
- a holding frame in which the high-pressure chamber is held during the application of high pressure,
- a pivot device by means of which the high-pressure chamber can be pivoted laterally out of the holding frame,
- at least one end-side closure for the high-pressure chamber,
- a delivery device by means of which the high-pressure medium is conveyed into the high-pressure chamber and is conveyed out again after the treatment process, and
- possibly a delivery device by means of which the product for treatment is conveyed into the high-pressure chamber and conveyed out again after the treatment process, wherein the seed action may self-evidently also be imparted manually.

Owing to the high pressure during the high-pressure treatment, it has proven expedient for the high-pressure chamber to be designed in the form of a cylindrical body. The high-pressure chamber has, at one end, normally at both ends, in each case one vessel closure. In order to introduce the products for treatment into the high-pressure chamber, the high-pressure chamber is, in the open state, pivoted or moved laterally out of the installation. In the open state of the high-pressure chamber, the vessel closures of the high-pressure chamber are normally anchored, by way of holding devices of the installation, on the frame, and are not anchored on the high-pressure chamber itself, that is to say are not jointly pivoted.

A further device is responsible for the control of the vessel closures. When goods have been fed into the high-pressure chamber, the high-pressure chamber is pivoted or moved into the holding frame. In this position, the high-pressure chamber is, by means of closure devices such as for example hydraulic cylinders, closed by way of the vessel closure or the two vessel closures and is then locked. One of the vessel closures normally has a feed facility for a fluid, and a discharge device for displaced air which must escape from the high-pressure vessel during the admission of the fluid. Furthermore, either one of the vessel closures or the high-pressure chamber itself has a device for the admission and discharge of high-pressure fluid.

DE 10 2009 042 088 A1 describes a device and a method for the high-pressure treatment of products, in particular packaged foodstuffs. For this purpose, a high-pressure chamber is filled and has pressure applied to it in stepped fashion, with particular attention being paid to the controlled pressure application and pressure release process. The method known from said document for preservation by means of high pressure consists in
- filling the high-pressure vessel with the product,
- closing the closures at the two end sides of the high-pressure vessel to such an extent that the fluid can be introduced and displaced air discharged,
- thereafter fully closing said closure and the fluid feed and the air outlet,
- then building up a predefined first pressure,
- then introducing further fluid into the high-pressure vessel via a high-pressure feed line until the desired final pressure is attained,
- maintaining said pressure for a particular time, for example 2 to 4 minutes,
- then discharging the fluid in a regulated manner such that the pressure corresponds again to the first pressure,
- then further reducing the pressure by discharging fluid, and discharging the fluid completely,
- then opening the vessel closures and removing the preserved product.

Here, the technical question arises as regards how the holding device of the high-pressure vessel and the devices for application of pressure should be designed. A particular problem here is that, for preservation, pressures of 6000 to 10,000 bar, that is to say 600 to 1000 hPa, are necessary. Even in the case of a very massive design of the load-bearing parts, it is inevitable that the holding frame, high-pressure vessel, closures, hydraulic devices, circular openings and seals will undergo triaxial deformation. Here, plastic deformation and leakage may arise, which must be prevented. It is the aim here that the entire device can operate without damage for between $10^5$ and $10^6$ product cycles.

Both the holding frame in which the high-pressure chamber is held and the high-pressure chamber itself, which during operation absorb the extremely high pressure forces imparted by the operating pressure, are produced under pressure preload by means of autofrettage, shrinkage or winding, whereby a very high admissible operating pressure can be applied. The respectively adequate safety margin with respect to the yield stress of the material is correspondingly factored in. By means of said preload, it is possible to attain optimum material utilization and thus make the installation which is subjected to the high pressure stresses durable. WO 2005/079966 A1 describes, for example, a method for winding a high-pressure chamber.

WO 2010/102644 A1 describes a high-pressure chamber, wherein the pressure chamber is composed of two cylinder sections which are connected to one another axially by means of fastening elements and in which the product for treatment is enclosed together with a pressure medium during the high-pressure treatment. The pressure chamber furthermore has a prestressed casing wound with steel band. The plugs of the pressure chamber are held by in each case one wound framework, wherein the framework is movable only perpendicular to the axis of the pressure chamber. Owing to the construction, the risk of rapid wear of the fastening elements in the parting joints of the segments is foreseeable.

DE 10 2005 014 835 A1 describes an isostatic press having a multi-part pressure vessel arranged in a press frame, wherein the pressure vessel is composed of multiple pressure vessel segments, which are assembled with an axial form fit, and closure covers.

WO 2011/091860 A1 relates to a high-pressure chamber comprising a removable basket device, wherein the products for treatment are subjected, in baskets within the high-pressure chamber, to high-pressure treatment. By means of elements, the baskets are fixedly anchored in the high-pressure chamber in order that the baskets together with the contents thereof do not turn over during operation. Furthermore, said document also discloses that the vessel closures of the high-pressure chamber are borne by a device which is arranged in each case laterally and parallel with respect to the frame scaffold.

A further technical problem consists in the support device by means of which the forces that arise during the application of high pressure are transmitted between the high-pressure vessel closure and holding device. The support device, if one is used at all, is normally of split design, as in the center there must remain a recess for the hydraulic cylinder which closes the vessel closure. The support device is moved into its position perpendicularly to the high-pressure vessel axis by way of pivot devices. Also, the support device deforms when a pressure of 6000 to 10,000 bar is applied. The support device lies against the holding device, with very high forces being transmitted. At 6000 to 10,000 bar, it is necessary for 600 MN (meganewtons) to 1 GN (giganewton) to be transmitted per square meter of cross-sectional area of the high-pressure vessel; this corresponds to 54 to 90 MN in the case of a typical pipe inner diameter of the high-pressure vessel of 0.3 m.

With regard to the introduction of force from the split support into the holding device, which has a cylindrical recess for the hydraulic cylinder, the technical problem arises here that the transverse stresses that occur under applications of pressure cause the cylindrical recess to be deformed into an oval shape. This results in leakages and consequently to considerable operating problems if the elastic deformations that occur under high pressure lead to permanent plastic deformations.

The invention is therefore based on the problem of providing a structurally simple installation and an economical method for the application of high pressure, in the case of which the elastic and plastic deformations under high pressure do not lead to operating problems.

The object is achieved by means of a device having
a holding frame in which the high-pressure chamber is held during the application of high pressure,
a withdrawal device by means of which the high-pressure chamber can be withdrawn laterally out of the holding frame,
at least one end-side closure with a closure plug for the high-pressure chamber,
at least one hydraulic drive for moving the end-side closure plug into the pressure vessel,
a line system having ports, by means of which line system the high-pressure medium can be conveyed into the high-pressure chamber and conveyed out again after the treatment process,
a support device which is arranged in movable fashion between the end sides of the high-pressure chamber and the holding frame and which, during the application of high pressure, transmits the force between vessel closure and holding frame,
wherein
the axial forces applied to the closure mechanism by the treatment pressure are absorbed by means of a force transmission device in the form of a semicircular disk,
the rounded side faces away from the high-pressure chamber,
which force transmission device, at its side facing toward the high-pressure chamber, has in each case one vertical support surface above and below the axis of the high-pressure vessel,
which force transmission device has, at its side facing toward the high-pressure chamber and in alignment with the axis of the high-pressure vessel, a receptacle for a hydraulic cylinder, with lateral ports for the pressurization with hydraulic fluid, and
the semicircular disks form a part of the outer casing, which bears hydraulic pressure, of the hydraulic cylinder.

The semicircular shape has the advantage that, on the circular side, it fits into the yoke of the holding frame if the latter, as is conventional, is wound; the winding has in this case great advantages with regard to the absorption of the forces because, during the winding of a band or of a wire, a preload can be applied.

In an advantageous refinement of the invention, the semicircular disks have undercut-like recesses; preferably, the undercut-like recesses are contoured such that peak loads on the semicircular disks in the region of the recess for the hydraulic cylinder are reduced. Said recesses have the effect that the notch stresses at the transition region from the support device into the semicircular disk are reduced. Owing to the reduction of the notch stresses, it is also the case that the deformations in said region, and thus the tendency for deformation of the hydraulic cylinder, are reduced.

In a further advantageous refinement of the invention, it is provided that the hydraulic cylinder inner part is mounted in floating fashion in a bushing composed of an elastic material. As elastic material, use is generally made of a suitable plastic.

In a further advantageous refinement of the invention, it is provided that the bushing is sealingly connected to the seal of the hydraulics.

The device according to the invention is particularly suitable for a method for the preservation of goods by application of high pressure, consisting in
filling the high-pressure vessel, which is open on both sides in the withdrawn state, with the product,
moving the high-pressure vessel into the holding frame,
closing the closure at one of the two end sides of the high-pressure vessel into a pre-fill position,
closing the closure at the opposite end side to such an extent that the fluid can be introduced and the displaced air discharged
thereafter fully closing said closure and the fluid feed and the air outlet,
then, by means of a displacement device, applying at least one support between the holding frame and closure of the high-pressure vessel,
locking the high-pressure vessel and retracting the hydraulic cylinder,
thereupon releasing the pressure in the hydraulic cylinder,
then introducing further fluid into the high-pressure vessel via a high-pressure feed line until the desired final pressure is attained,
maintaining said pressure for a particular time,
then discharging the fluid such that the pressure lies below the first pressure again,
then moving the hydraulic cylinder toward the vessel closure again under pressure,
then removing the support again,
then reducing the pressure in the high-pressure vessel by retracting the hydraulic cylinder with the closure,
then further reducing the pressure by discharging fluid, and discharging the fluid,
then opening the vessel closures,
then moving the high-pressure vessel out of the holding frame,
and removing the preserved product.

Here, it may also be provided that, after the closure of the high-pressure vessel, of the fluid feed and of the air outlet, the closure is, by means of a hydraulic cylinder, pushed axially further into the high-pressure vessel until a stop is reached, and a predefined first pressure has built up. Said pressure is preferably <80 bar.

Figure 2:
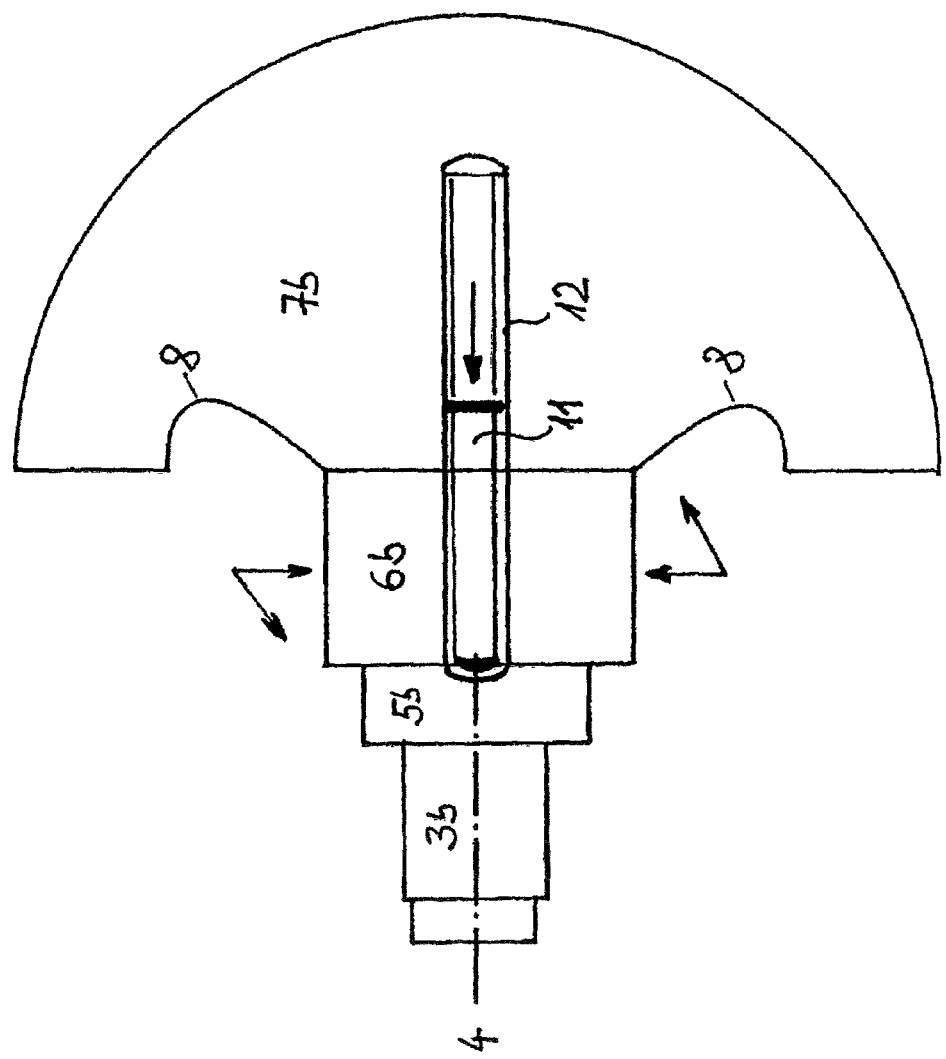

The invention will be discussed in more detail below on the basis of 2 sketches, in which:

FIG. 1: shows a holding frame with high-pressure vessel, high-pressure chamber and closure, and FIG. 2: shows a semicircular force transmission device in section.

FIG. 1 shows a high-pressure vessel 1 with a high-pressure chamber 2 which is closed off at the end sides by the closure plugs 3a and 3b. The high-pressure vessel 1, high-pressure chamber 2 and the closure plugs 3a and 3b have a circular cross section about the axis 4 of the high-pressure vessel; the closure plugs 3a and 3b also have openings for high-pressure media and escaping displaced air. The closure plugs 3a and 3b have in each case a shoulder 5a and 5b which acts in each case as a contact collar of the closure plug, said contact collars bearing against the high-pressure vessel 1 at the end side during the application of pressure. Said contact collars are supported at the outside against the supports 6a and 6b, which are of cuboidal form and are split in the plane of the drawing. Said supports also have a circular recess along the axis 4 of the high-pressure vessel. The supports 6a and 6v are supported on the semicircular disks 7a and 7b with undercut-like recesses 8. The semicircular disks 7a and 7b are supported against the pillars of the holding frame 9a and 9b. They are held together by way of the encircling wire winding 10.

FIG. 2 shows the closure plug 3b with the shoulder 5b, the support 6b and the semicircular disk 7b. The hydraulic piston 11 is let into the semicircular disk 7b in the slidingly mounted hydraulic cylinder inner part 12, which is connected to a hydraulic system (not shown).

When the high-pressure chamber 2 has been filled with the goods and the high-pressure vessel 1 is situated in the holding frame (7a, 7b, 9a, 9b, 10), the closure plugs 3a and 3b are firstly placed into the closure position by means of the hydraulic pistons 11. Then, high-pressure medium is introduced into the high-pressure chamber, wherein air escapes. By means of the hydraulic piston 11, the closure plug is pushed further into the hydraulic chamber, wherein the remaining air escapes. After the closure of the air outlet, the closure plug 3a and 3b is pushed in further until the shoulder 5a and 5b bears against the high-pressure vessel 1. In this state, the supports 6a and 6b are pushed in from the side. The piston 11 is retracted slightly in the cylinder 12 and relieved of pressure; the already acting pressure thereafter acts on the supports 6a and 6b, which transmit said pressure to the semicircular disks 7a and 7b. Thereafter, by means of a high-pressure pump (not shown), high-pressure medium is forced into the high-pressure chamber, which in turn presses the closure plugs 3a and 3b against the supports 6a and 6b with high force. Said supports cause the semicircular disk to deform such that the hydraulic cylinder inner part 12 also has an oval cross section. Said hydraulic cylinder inner part is thus mounted in sliding fashion in a plastics sleeve. Since the hydraulic piston 11 is unpressurized during the application of high pressure, this does not lead to leakages. After the application of high pressure, the same process can be performed in the reverse sequence. In this way, an operationally reliable and economical method for batchwise application of high pressure is made possible.

LIST OF REFERENCE SIGNS

1 High-pressure vessel
2 High-pressure chamber
3, 3a, 3b Closure plug
4 Axis of the high-pressure vessel
5a, 5b Shoulder
6a, 6b Support
7a, 7b Semicircular disk
8 Undercut-like recesses
9a, 9b Pillars of the holding frame
10 Wire coil
11 Hydraulic piston
12 Hydraulic cylinder inner part

The invention claimed is:

1. A device for high-pressure treatment of goods, the device comprising:
   a pressure vessel defining a high-pressure chamber therewithin;
   a holding frame configured to hold the high-pressure chamber during an application of high pressure;
   at least one end-side closure with a closure plug configured to seal the high-pressure chamber;
   at least one hydraulic drive configured to move the closure plug into the chamber, the at least one hydraulic drive including a hydraulic cylinder with a hydraulic piston;
   a support device that is removably positionable between the pressure vessel and the holding frame, wherein during the application of high pressure the support device transmits force between the at least one end-side closure and the holding frame;
   a force transmission device in the form of a semicircular disk that absorbs axial forces applied to the at least one end-side closure by the application of high pressure; and
   a pump that performs the application of high pressure to the high-pressure chamber when the hydraulic piston is inactive and when the support device is removably positioned between the closure plug and the force transmission device,
   wherein the side of the force transmission device facing the high-pressure chamber includes a receptacle configured to accommodate the hydraulic cylinder with the hydraulic piston that is configured to act on the closure plug,
   wherein the receptacle is aligned with an axis of the pressure vessel.

2. The device as claimed in claim 1, wherein the semicircular disk has an undercut-like recess.

3. The device as claimed in claim 2, wherein the undercut-like recess is contoured such that a peak load on the semicircular disk in the region of the recess for the hydraulic cylinder is reduced.

4. The device as claimed in claim 1 wherein a hydraulic cylinder inner part is mounted in floating fashion in a bushing comprised of an elastic material.

5. The device as claimed in claim 4, wherein the bushing is sealingly connected to a seal of the hydraulics.

6. The device of claim 1 wherein the hydraulic piston is at least partially retracted in the hydraulic cylinder and is relieved of pressure when the pump performs the application of high pressure.

7. A device for high-pressure treatment of goods in a closable high-pressure chamber, the device comprising:
   a high-pressure vessel defining a high-pressure chamber therein;
   a holding frame in which the high-pressure vessel is held during an application of high pressure within the high-pressure chamber;

at least one end-side closure with a closure plug configured to seal the high-pressure chamber;

at least one hydraulic drive comprising a hydraulic cylinder and configured to move the closure plug into an end of the high-pressure chamber of the high-pressure vessel;

a line system having ports, by way of which line system a high-pressure medium can be conveyed into the high-pressure chamber of the high-pressure vessel and conveyed out again after the application of high pressure; and a support device that is selectively moveable relative to the high-pressure vessel in a direction perpendicular to a longitudinal axis of the high-pressure vessel so as to be removably positionable between the holding frame and the at least one end-side closure when the closure plug is inserted into an open end of the high-pressure chamber, wherein during the application of high pressure the support device transmits force between the at least one end-side closure and the holding frame, wherein axial forces applied to the at least one end-side closure by the application of high pressure are absorbed by a force transmission device in the form of a semicircular disk, wherein a rounded side of the semicircular disk faces away from the high-pressure chamber, wherein a side of the force transmission device that faces the high-pressure chamber includes a vertical support surface that extends above and below an axis of the pressure vessel, wherein the at least one hydraulic drive is disposed in, and extends from, the side of the force transmission device facing the high-pressure chamber, and is axially parallel to the axis of the high pressure vessel, wherein the side of the force transmission device facing the high-pressure chamber defines a receptacle configured to accommodate therein the hydraulic cylinder of the at least one hydraulic drive, the receptacle having lateral ports defined therein through which ports the hydraulic cylinder may be pressurized with hydraulic fluid, wherein the receptacle is aligned with the axis of the pressure vessel, wherein the semicircular disk forms a part of an outer casing, which bears hydraulic pressure, of the hydraulic cylinder.

8. The device as claimed in claim 7, wherein the semicircular disk has an undercut-like recess.

9. The device as claimed in claim 8, wherein the undercut-like recess is contoured such that a peak load on the semicircular disk in the region of the recess for the hydraulic cylinder is reduced.

10. The device as claimed in claim 7 wherein a hydraulic cylinder inner part is mounted in floating fashion in a bushing comprised of an elastic material.

11. The device as claimed in claim 10, wherein the bushing is sealingly connected to a seal of the hydraulics.

12. The device of claim 7 comprising a pump that performs the application of high pressure to the high-pressure chamber after the hydraulic drive is relieved of pressure and after the support device is removably positioned between the closure plug and the force transmission device.

13. The device of claim 7 wherein the hydraulic drive is relieved of pressure during the application of high pressure.

* * * * *